June 14, 1927.
A. C. WEBSTER
1,632,049
CONNECTION FOR PISTONS AND CONNECTING RODS
Filed May 12, 1924
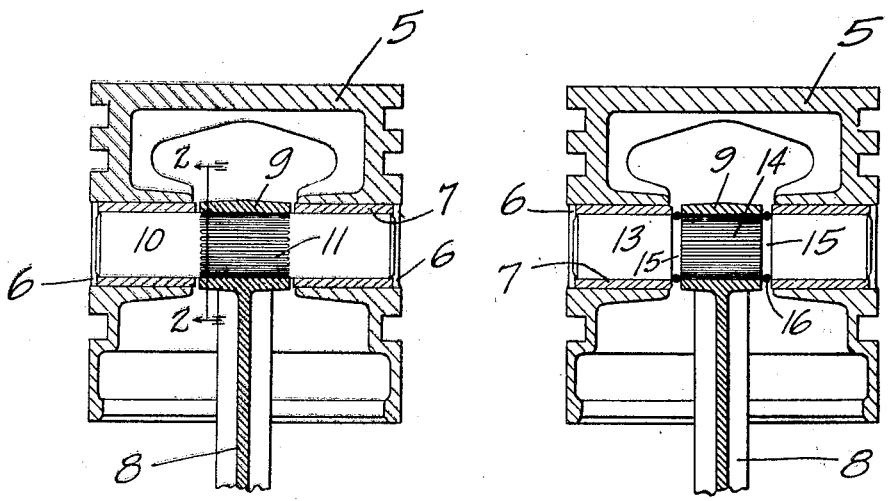
Fig. 1
Fig. 3
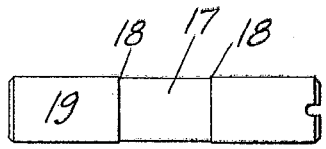
Fig. 4
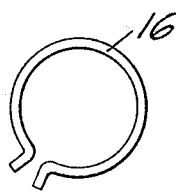
Fig. 5
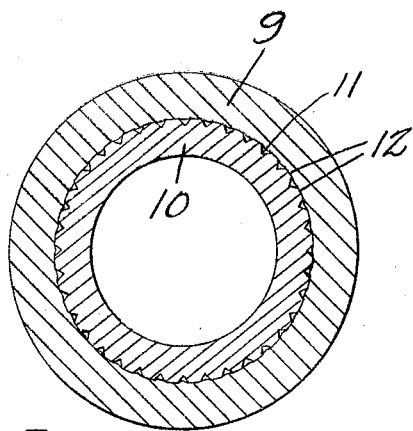
Fig. 2
INVENTOR
Arvin C. Webster
BY
*[signature]*
ATTORNEY Patented June 14, 1927.

1,632,049

UNITED STATES PATENT OFFICE.

ARVIN C. WEBSTER, OF DETROIT, MICHIGAN.

CONNECTION FOR PISTONS AND CONNECTING RODS.

Application filed May 12, 1924. Serial No. 712,902.

It is universal practice in the automobile industry to connect the pistons used in automobiles with a connecting rod by means of a wrist pin disposed in the piston and through an opening in the end of the connecting rod. In order to prevent the wrist-pin from turning in the connecting rod and also to prevent longitudinal movement of the pin, it is customary to clamp the same therein by various methods.

It is the primary object of my invention to provide means for connecting the end of the connecting rod to the wrist pin in the piston in such a manner as to do away with such clamping means, and at the same time prevent turning of the wrist pin in the connecting rod opening as well as longitudinal movement thereof beyond the side walls of the piston.

With these and other objects in view my invention consists in the arrangement, combination and construction of the various parts of my improved device as described in the specification, claimed in my claims and shown in the accompanying drawings in which:

Fig. 1 is a central sectional view of a piston and connecting rod showing my invention.

Fig. 2 is a sectional view taken on line 2—2 of Fig. 1.

Fig. 3 is a central sectional view of a piston and connecting rod showing a modification of the foregoing construction.

Fig. 4 is an elevation showing a modified wrist pin somewhat similar to the construction shown in Fig. 3.

Fig. 5 is a detailed view showing a securing ring used in the construction shown in Fig. 3.

I have shown a piston designated generally throughout as 5 having the conventional side openings 6 therein within which are positioned bushings or bearings 7. I have also shown a conventional connecting rod 8 having an apertured boss 9 on the end thereof.

In Fig. 1 I have shown a wrist pin 10 adapted to pass within the openings 6 of the piston, and the aperture provided in the boss 9 of the connecting rod and in which the diameter of said aperture is slightly smaller than the diameter of the wrist pin 10 so that in assembly the wrist pin 10 is driven through the opening in the boss 9, the metal in the boss being expanded slightly in order to permit passage of the pin therethrough. When the pin is in place therefore the metal is contracted firmly about the body of the same so as to prevent slippage of the pin transversely or rotation thereof in the apertured boss 9.

The central portion of the pin 10 is knurled as at 11 in order to assist in preventing dislocation or turning of the pin within the aperture. When the knurled portion 11 is formed, the elevation of the knurls will be slightly higher than the body diameter of the rest of the pin. The tops of the knurls, however, are trimmed off so as to present relatively flat lands 12, and bring the diameter of the knurled portion down to one equal to the diameter of the remaining portion of the pin.

In the modification shown in Fig. 3 the wrist pin 13 is provided with knurls 14 to prevent rotation of the pin in the apertured boss of the connecting rod. In addition grooves 15 are provided on either side of the knurled portion, and split spring rings 16 are disposed in these grooves so that when the pin has been driven in position, the expansion of the rings 16 will cause them to bear against the inner edges of the bushings 7 and prevent longitudinal movement of the pin 13 in the bushings.

The rings 16 may, if it is desired, be provided with turned up ends so as to make their removal from the grooves an easy task, when it is desired to disassemble the connections.

In the modified form of wrist pin shown as 19 in Fig. 4 the central portion 17 thereof is smaller than the outer ends so that when the pin is driven into position thru an apertured boss on the end of the connecting rod, slightly smaller than the ends of the pin, the shoulders 18 will bear against the outer edges of the boss 9 so as to securely hold the pin therein against transverse movement.

It will thus be seen that I have provided efficient and economical means for making the connection between a connecting rod and piston without the necessity of employing clamping means therein.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a piston having aligned openings therein, a connecting rod having an aperture therein aligned with said openings, a pin extended into said openings and thru said aperture that portion of the pin engaged in said aperture being originally larger than the aperture and being forced into said aperture under pressure, and said portion being provided with a plurality of knurls having relatively flat tops.

2. In combination, a piston having aligned openings therein, a connecting rod having an aperture therein aligned with said openings, a pin extended into said openings and thru said aperture that portion of the pin engaged in said aperture being originally larger than the aperture and being forced into said aperture under pressure, and said portion being provided with a plurality of knurls, which have been first formed and then slightly cut away to form relatively flat tops.

3. In combination, a piston having aligned openings therein, a connecting rod having an aperture therein aligned with said openings, a pin extended into said openings and thru said aperture, a groove in said pin and means in said groove for preventing longitudinal movement of the pin in said openings, said means including a spring ring adapted to bear against said rod and a portion of said piston.

4. In combination, a piston having aligned openings therein, a connecting rod having an aperture therein aligned with said openings, a pin extended into said openings and thru said aperture, a pair of grooves in said pin, one positioned between one side of said aperture and one of said openings and the other positioned between the other side of said aperture and the other of said openings, and a pair of split spring rings, one in each of said grooves, adapted to bear against the surrounding portions of said aperture and openings to prevent longitudinal movement of the pin.

ARVIN C. WEBSTER.